United States Patent [19]

Ohta et al.

[11] Patent Number: 4,827,342
[45] Date of Patent: May 2, 1989

[54] VIDEO SIGNAL PROCESSING APPARATUS FOR REMOVING NOISE FROM REPRODUCED SIGNALS

[75] Inventors: Haruo Ohta; Masao Tomita, both of Neyagawa, Japan

[73] Assignee: Matsushita Electric Industrial Co., Ltd., Osaka, Japan

[21] Appl. No.: 102,243

[22] Filed: Sep. 28, 1987

Related U.S. Application Data

[63] Continuation of Ser. No. 748,466, Jun. 25, 1985, abandoned.

[30] Foreign Application Priority Data

| Jun. 30, 1984 | [JP] | Japan | 59-135752 |
| Jun. 30, 1984 | [JP] | Japan | 59-135753 |
| Aug. 24, 1984 | [JP] | Japan | 59-175928 |
| Sep. 5, 1984 | [JP] | Japan | 59-185850 |

[51] Int. Cl.$^4$ .................................... H04N 5/213
[52] U.S. Cl. .................................... 358/167
[58] Field of Search ............... 358/167, 166, 36, 37, 358/905; 455/296, 303, 308; 375/60, 99, 103

[56] References Cited

U.S. PATENT DOCUMENTS

| 4,031,364 | 6/1977 | Wolmot | 358/167 |
| 4,249,210 | 2/1981 | Storey | 358/167 |
| 4,302,768 | 11/1981 | Kamura | 358/167 |
| 4,404,600 | 9/1983 | Murakami | 358/905 |
| 4,573,075 | 2/1986 | Bolger | 358/36 |

Primary Examiner—Tommy P. Chin
Attorney, Agent, or Firm—Wenderoth, Lind & Ponack

[57] ABSTRACT

A video signal processing apparatus includes a digital vertical filter for passing a signal in a specific vertical high frequency band of a digitized input luminance signal and a digital nonlinear processing circuit having a nonlinear input-output characteristic for nonlinearly processing the signal from the vertical filter so that one of a luminance signal component and a noise component of the signal from the vertical filter is suppressed while the other is maintained as is or so that the luminance signal component is emphasized while the noise component is maintained as is or suppressed. The apparatus also includes an arithmetic operation circuit for arithmetically synthesizing the digitized input luminance signal and an output signal of the nonlinear processing circuit so that the noise component is canceled or the luminance signal is increased, thereby obtaining a digitized luminance signal having an improved signal-to-noise ratio in the specific vertical high frequency band.

19 Claims, 8 Drawing Sheets

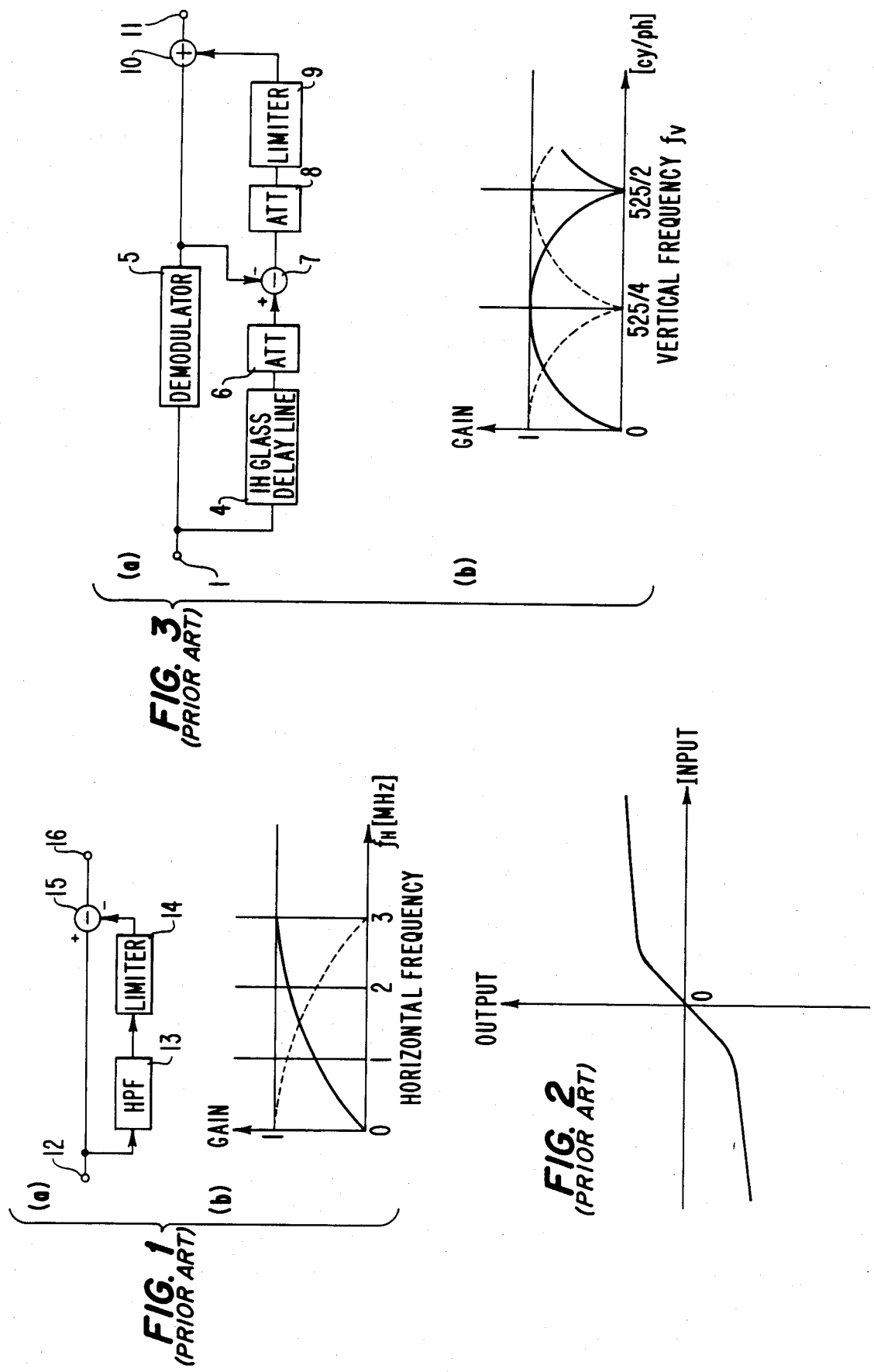

VIDEO SIGNAL PROCESSING APPARATUS FOR REMOVING NOISE FROM REPRODUCED SIGNALS

This application is a continuation of now abandoned application Ser. No. 748,466, filed June 25, 1985.

BACKGROUND OF THE INVENTION

1. Field of the Invention

This invention relates to a video signal processing apparatus capable of removing noise effectively without deteriorating the picture quality for use in a video tape recorder (VTR) or the like.

1. Description of the Prior Art

Recently, in generally used consumer VTR sets, apparatus for removing low level noise of high frequency band signal and noise removing apparatus utilizing the line correlation are used to remove noises mixed in the reproduced signals.

The noise removing apparatus for high frequency band which has been widely used is described below. FIG. 1(a) is its block diagram, in which numeral 12 is an input terminal of reproduced and demodulated luminance signal, 13 is a high pass filter, 14 is a limiter, 15 is a subtractor, and 16 is an output terminal of the signal with reduced noise.

The operation of the noise removing circuit thus composed is as follows. The high-pass filter 13 has a frequency characteristic as indicated by solid line in FIG. 1(b), for example, when the horizontal frequency $f_H$ is taken on the axis of abscissas, and the noise and signal in high band are led into the limiter 13. The limiter 13 is composed usually of semiconductor nonlinear elements, and its input-output characteristic is as shown in FIG. 2. Accordingly, when the input component of the limiter is a noise with a small amplitude, it passes through the limiter and is subtracted by the subtractor 15, and the frequency characteristic of the apparatus from the input terminal 12 to output terminal 14 becomes a low-pass performance as shown by broken line in FIG. 1(b), so that the noise in high band is removed. However, when a high band signal with a large amplitude is contained in the input signal, since the amplitude is limited by the limiter, this signal is transmitted to the output terminal 16, being hardly deteriorated from the input terminal 12.

In a consumer VTR, meanwhile, since the S/N ratio is still insufficient by the noise removing apparatus for high band as shown in FIG. 1 alone, a noise removing apparatus utilizing the line correlation is used at the same time. Referring further to the drawing, the conventional noise removing apparatus utilizing the line correlation is described. FIG. 3(a) is a schematic structural drawing of the conventional noise removing apparatus utilizing the line correlation, in which numeral 1 is an input terminal of reproduced FM luminance signal, 4 is a glass delay line for delaying the FM signal by 1H, 5 and 6 are demodulators for frequency demodulation, 7 is a subtractor for obtaining the difference between the demodulated luminance signal and the 1H delayed luminance signal, 8 is an attenuator for attenuating the output signal of the subtractor 7 to about ½, 9 is a limiter for limiting the amplitude of signal, 10 is an adder for adding the output signal of demodulator 5 and output signal of limiter 9, and 11 is an output terminal of signal. An example of such noise removing apparatus is disclosed in the Japanese Unexamined Patent Publication Sho. No. 55-80966.

The operation of thus composed noise removing apparatus utilizing the line correlation is as follows. In FIG. 3, the line from the input terminal to limiter 9 has the so-called C-shaped comb line filter characteristic with respect to the demodulated signals, and when the vertical frequency $f_V$ is taken on the axis of abscissas, in the case of NTSC system, the frequency characteristic becomes as shown by solid line in FIG. 3(b) (where cy/ph refers to cycles/picture height), and the noise without line correlation and signal are fed into the limiter 9. Here, the input-output characteristic of the limiter 9 is as shown in FIG. 2. Therefore, when the component without line correlation which is led into the limiter 9 has only a small amplitude to be-regarded as noise, it directly passes through the limiter. As a result, the apparatus from the input terminal 1 to the output terminal 11 has the so-called Y-shaped comb line filter characteristic with respect to the demodulated signal, so that the noise in the vicinity of the vertical frequency 525/4 (cy/ph) as indicated by broken line in FIG. 3(b) is removed. However, if the component fed into the limiter 9 is a signal without line correlation having a large amplitude, since the amplitude is limited by the limiter, the output signal from the demodulator 5 is delivered almost directly to the output terminal 11, without being removed. Thus the vertical resolution of the picture is not deteriorated so much.

Nevertheless, since thus composed conventional noise removing apparatus for high band and noise removing apparatus utilizing the line correlation are composed of analog circuits, many parts are required to make up circuits, and the structure of the VTR is much complicated. Besides, since the operation of the limiter depends on the nonlinear characteristic of semiconductor, it is difficult to realize a desired characteristic, and if the input signal amplitude is large, the output amplitude of the limiter does not become 0, so that the resolution of the picture may be deteriorated more or less. Still, in the noise removing apparatus utilizing the line correlation, since the 1H delay-is effected in the form of FM signal by using glass delay line, two demodulators are required, and yet the noise removing effect may not be exhibited sufficiently due to the instability of frequency characteristic of the glass delay line or inaccuracy of delay time. It was also difficult to reduce the size of the apparatus.

SUMMARY OF THE INVENTION

This invention is intended to solve the above-discussed problems in the prior art, and is further intended to present a video signal processing apparatus capable of obtaining an excellent noise removing effect without deteriorating the signal, while simplifying the structure of the apparatus and reducing the manufacturing cost.

A video signal processing apparatus of this invention comprises a digital filter for passing a specific frequency band of digitized input luminance signal, and a nonlinear processing circuit for nonlinearly processing the output of the digital filter, wherein the pass band component of the filter is suppressed or emphasized depending on the input signal amplitude of the nonlinear processing circuit.

For example, the apparatus comprises a high-pass filter for passing the high band component of digitized input luminance signal, a nonlinear processing circuit for nonlinearly processing the output of the high-pass filter, and an arithmetic circuit for mixing the input luminance signal with the output signal of the nonlinear processing circuit.

Since all these components are composed of digital circuits, they can be realized as a one-chip semiconductor device, so that the apparatus can be simplified, be adjustment-free and lowered in cost.

Moreover, since processing is effected in the form of digital signal, the input-output characteristic of the nonlinear processing circuit can be freely set. Therefore, by determining this characteristic in a way to suppress the frequency component passing through the filter, of the input luminance signal, in a small amplitude range of input signal of the nonlinear processing circuit, the noise can be reduced without deteriorating the signal quality. Furthermore, in a range where the input signal amplitude of the nonlinear processing circuit is larger than a specified level, by determining the nonlinear input-output characteristic in such a way as to emphasize the frequency component passing through the filter, the picture can be clarified without emphasizing the noise. Still more, by determining the nonlinear input-output characteristic so as to suppress the frequency component passing through the filter when the input signal is smaller than a specified level and to emphasize when the range of the input signal amplitude is otherwise, the noise can be suppressed while the signal picture can be clarified. In these nonlinear processing circuits, any nonlinear input-output characteristic can be easily realized, for example, by using ROM. Or, by designing the nonlinear processing circuit so as to select any desired one of plural kinds of input-output characteristics, the noise reduction extent and the picture resolution can be freely adjusted depending on the nature of the picture, S/N ratio or the taste of the user.

Furthermore, when the filter is designed in a bandpass type one, the noise in the medium range which is likely to impede visually may be removed.

Or when the filter is a one which relates the vertical frequency by using the memory for delaying the signal by one horizontal scanning, period, many defects of the glass delay line may be overcome as compared with the conventional noise removing apparatus utilizing the line correlation by glass delay line, and an excellent noise removing effect can be obtained, and the demodulator is required only in one line.

In a further advanced form of execution, the apparatus may be comprised by plural filter means for dividing the horizontal and vertical two-dimensional frequency regions of digitized input luminance signals into plural two-dimensional frequency regions, nonlinear processing means for nonlinearly processing the outputs of the plural filters, and a mixing means for mixing the outputs of the nonlinear processing means.

For example, by dividing the horizontal and vertical two-dimensional frequency regions into four bands, the signals are individually processed nonlinearly and synthesized. By thus composing, several more excellent effects are exhibited. That is, since the noise uniformly distributed in all bands is divided into small sections by the frequencies and are led into the nonlinear processing circuit, the noise and signal can be separated smoothly in each nonlinear processing circuit, and only the noise can be suppressed without deteriorating the delicate luminance changes. Furthermore, when noise is superposed on the signal, by separately processing nonlinearly the frequency band including the signal spectrum and the other frequency band, a beautiful picture can be obtained by effectively removing the overlaying noise. And optimum nonlinear characteristics may be determined depending on the signal of the individual divided frequency bands, noise property, and visual characteristics, and an excellent noise removing effect can be obtained by keeping the deterioration of visual picture quality to a minimum.

At this time, by utilizing the signal delayed for one horizontal scanning period obtained at the time of making up a filter, the dropout may be compensated. Since this dropout compensation function is to drop out in the form of digital signal after demodulating the reproduced FM signal, the noise occurring due to discontinuation at the changing point of the phase of FM signal as experienced conventional does not take place. Or a dropout extending over a long period exceeding 1H may be smoothly compensated because the data is delayed in the form of digital signal, without deterioration of the picture quality due to decrease of amplitude or band as experienced conventionally.

BRIEF DESCRIPTION OF THE DRAWINGS

FIGS. 1(a) and (b) are a block diagram and a frequency characteristic diagram of a conventional high band noise removing apparatus, respectively;

FIG. 2 is an input-output characteristic diagram of a limiter in a conventional noise removing apparatus;

FIGS. 3(a) and (b) are a block diagram and a frequency characteristic diagram of a conventional noise removing apparatus utilizing the line correlation, respectively;

DESCRIPTION OF THE PREFERRED EMBODIMENTS

Figure 4:
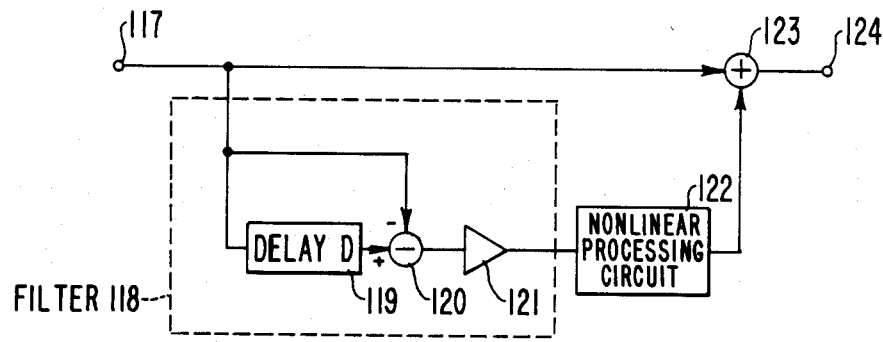
FIG. 4 is a block diagram of a video signal processing apparatus in a first embodiment of this invention.

FIG. 4 is a circuit block diagram of a video signal processing apparatus in a first embodiment of this invention, in which numeral 117 is an input terminal of luminance signal which has been digitized after being reproduced from the VTR and frequency demodulated, and 118 is a filter. This filter 118 is composed of a delay circuit 119 with delay time D, an arithmetic circuit 120, and a coefficient circuit 121. Numeral 122 is a nonlinear processing circuit for nonlinearly processing the output signal from the filter 118, 123 is an adder for adding the output signal of the nonlinear processing circuit 122 and the input luminance signal, and 124 is an output terminal for delivering the processed signal.

Figure 5:
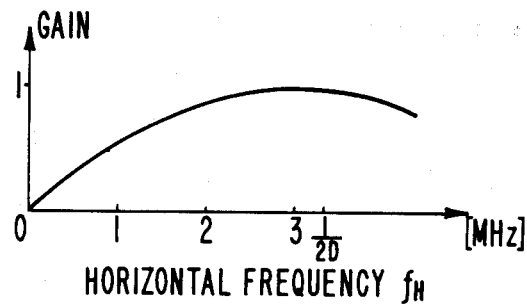
FIG. 5 and FIGS. 6(a) and (b) are diagrams showing the operation of the first embodiment of this invention.
Figure 6:
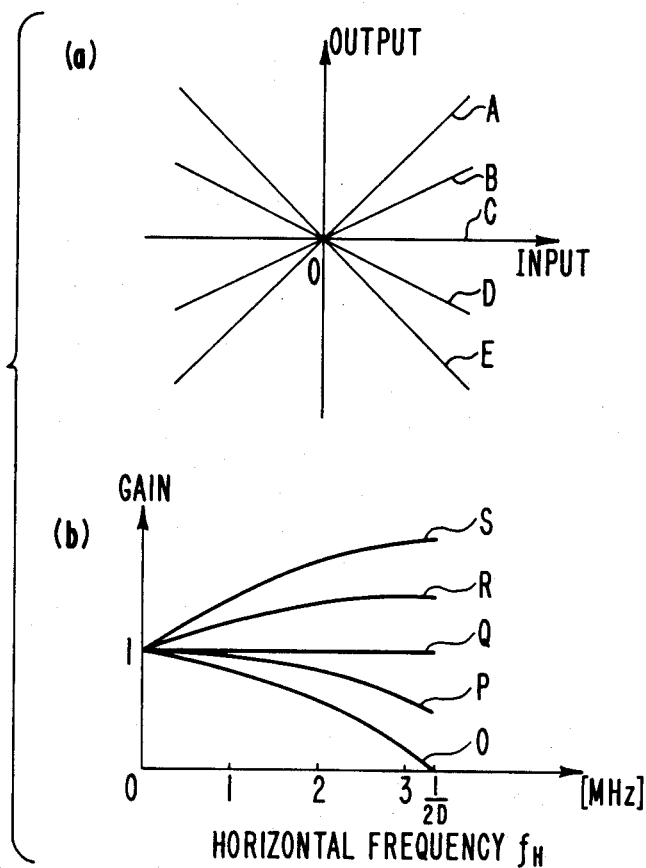

Its operation is as follows. First, the basic operation of this embodiment will be described. The frequency characteristic of the filter 118 is a high band passing type performance as shown in FIG. 5 when, for example, the delay time D is about 14 nsec, and the higher band portion of the luminance signal fed into the input terminal 117 is allowed to pass and supplied into the nonlinear processing circuit 122. Supposing the input-output characteristic of the nonlinear processing circuit 122 to be as indicated by solid line C in FIG. 6(a), the signal fed to the input terminal 117 appears directly at the output terminal 124 in FIG. 4, and the frequency characteristic of the line from the input terminal 117 to the output terminal 124 becomes as shown by solid line Q in FIG. 6(b). On the other hand, when the input-output characteristic of the nonlinear processing circuit 122 is as indicated by solid line A in FIG. 6(a), the frequency characteristic of the apparatus becomes as shown by solid line O in FIG. 6(b), which is a low band passing type characteristic. To the contrary, when the input-output characteristic of the nonlinear processing circuit 122 is as shown by solid line E in FIG. 6(a), the frequency characteristic of the apparatus will emphasize the high band as indicated by solid line S in FIG. 6(b). Similarly, when the input-output characteristic is as shown by solid lines B and D in FIG. 6(a), the frequency characteristic of the apparatus becomes as shown by solid lines P and R in FIG. 6(b). This is the basic operation of this embodiment.

Figures 7A, 7B, 7C:
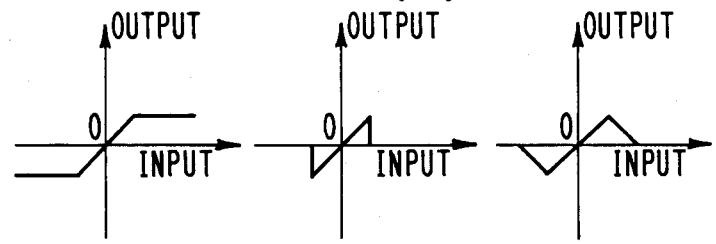
FIGS. 7(a)–7(f) are input-output characteristic diagrams of nonlinear processing circuits in the first to fourth embodiments of this invention.
Figures 7D, 7E, 7F:
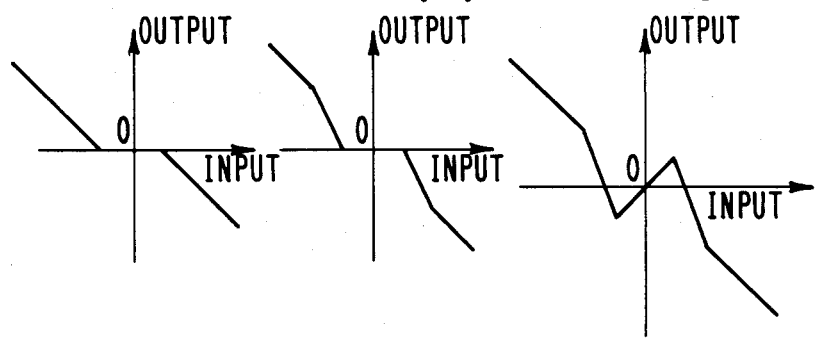

Supposing now that a reproduced luminance signal containing noise is fed into the input terminal 117, the high band component is extracted by the filter 118, and fed into the nonlinear processing circuit 122. Here, generally, since the luminance signal is mostly composed of low frequency components, the extracted high band components with a small amplitude may be almost regarded as the noise. Accordingly, when the input-output characteristic of the nonlinear processing circuit 122 is determined as shown in FIG. 7(a), the frequency characteristic of the apparatus becomes as shown by solid line O in FIG. 6 if the high band component obtained by the filter 118 in FIG. 4 is low in level and may be regarded as noise, so that the noise in the high band may be suppressed. Whereas if the high band component obtained by the filter 118 is large and may be regarded as signal, the frequency characteristic of the device becomes as shown by solid line Q in FIG. 6(b), so that the signal may not be deteriorated. However, in the nonlinear characteristic in FIG. 7(a), since the output does not become 0 if the input is sufficiently large, the resolution may be deteriorated more or less. Accordingly, it is possible to modify the nonlinear characteristic as shown in FIG. 7(b). As a result, the resolution of the signal will never be deteriorated. However, in this characteristic, since it is discontinuous in the threshold area, an unnatural impedance may be caused in this discontinuous part depending on the threshold level. In this case, as shown in FIG. 7(c), it can be improved by setting up a characteristic free of discontinuous point. In this way, by properly setting the nonlinear characteristic, the noise can be suppressed without deteriorating the signal. On the other hand, it is also possible to set the nonlinear input-output characteristic as shown in FIG. 7(d). In this case, when the signal amplitude passing through the filter 118 is large and may be regarded as signal, the frequency characteristic of the device emphasizes the high band as indicated by solid line S in FIG. 6(b). Or, when the amplitude of the signal passing through the filter 118 is small and it may be regarded as noise, the frequency characteristic of the device becomes as indicated by solid line Q in FIG. 6(b), so that the noise may not be emphasized. Thus, without emphasizing the noise, the resolution of the picture can be enhanced. Or when a nonlinear characteristic as shown in FIG. 7(e) is used, the resolution of the picture can be further enhanced even in a signal with a relatively small amplitude. Or, it may be also possible to determine the nonlinear characteristic as shown in FIG. 7(f). In this case, as estimated from the explanation above, the noise is suppressed by the frequency characteristic of solid line O in FIG. 6(b), while the signal is emphasized in the high band by the characteristic of solid line S in FIG. 6(b).

Meanwhile, concerning the structure of the nonlinear processing circuit 122 having various nonlinear input-output characteristics as shown in FIG. 7, various compositions may be considered by proper combination of logic circuits depending on the individual characteristics, and by using read-only memories (hereinafter referred to ROM), various nonlinear characteristics may be realized very easily. That is, using the input signal to the nonlinear processing circuit 122 as the address, a desired characteristic can be realized by composing so that the memory content corresponding to the address is delivered as output signal, and by storing the predetermined input-output characteristics.

In this embodiment, since processing is effected in the form of digital signal, the input-output characteristic of the nonlinear processing circuit can be freely set, and it can be easily realized, in particular, by using ROM. As a result, the characteristic to suppress the noise without deteriorating the signal, the characteristic to improve the resolution of the picture without emphasizing the noise, and even the characteristic to suppress the noise and improve the picture resolution at the same time can be easily realized. Besides, since all processings are effected in the form of digital signal, all components can be formed on one-chip semiconductor, so that reduction of size and manufacturing cost of the apparatus can be realized. Thus, many advantages are brought about.

Incidentally, in the above embodiment, the nonlinear processing circuit 122 has one nonlinear input-output characteristic, but it may be also possible to possess plural nonlinear input-output characteristics and use one of them selectively. This technique is explained by referring to FIG. 8, in which numeral 129 is a nonlinear processing circuit, 127 and 128 are input and output terminals of the nonlinear processing circuit 129. This nonlinear processing circuit 129 comprises nonlinear input/output circuits 130a to 130n possessing different nonlinear input-output characteristics, and a switch 131 to select one of these nonlinear input/output circuits 130a to 130n, and this switch 131 is controlled by a control signal 132. This nonlinear processing circuit 129 can be easily realized, for example, by storing plural kinds of input-output characteristics in a table in a ROM and selecting one of them. By using such nonlinear processing circuit 129, the frequency correction and noise reduction range can be properly adjusted depending on the property of picture, S/N ratio or the taste of the user.

Figure 9:
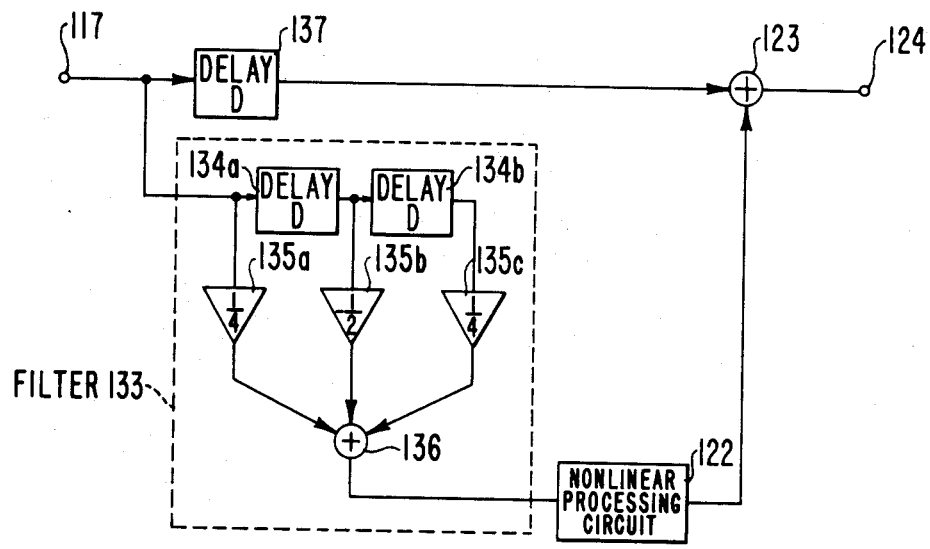
FIG. 9 is a block diagram of a video signal processing apparatus in a second embodiment of this invention.

FIG. 9 is a circuit block diagram of a video signal processing apparatus in a second embodiment of this invention, in which numeral 133 is a filter composed of delay circuits 134a and 134b each with delay time D, coefficient circuits 135a to 135c with coefficients ¼, −½ and ¼ respectively, and an adder 136, and numeral 137 is a delay, circuit with delay time D for feeding the input luminance signal into the adder 132.

In this second embodiment, what differs from the first embodiment in FIG. 4 lies in the composition of the filter 133 and the insertion of delay circuit 137. In the frequency region, the frequency characteristic of the filter 133 is nearly same as that of the filter 118 in FIG. 4 as shown in FIG. 5, and the relation between the characteristic of the nonlinear processing circuit 122 and the line from the input terminal 117 to output terminal 124 is nearly same as in the case of the first embodiment explained with reference to FIG. 6(a) and (b). However, in the first embodiment shown in FIG. 4, the delay time from the input of the filter 118 to its output varies with the frequency, and the delay time of the signal from the input terminal 117 to the output terminal 124 varies, as a result of the above, depending on the frequency of input signal or characteristic of the nonlinear processing circuit 122, so that the picture quality may be unnaturally deteriorated. By contrast, in this embodiment, the delay time between input and output of the filter 133 remains constant (D) regardless of the frequency of signal, and the delay time of the signal from input terminal 117 to output terminal 124 is always D, as a result of insertion of the delay circuit 137, regardless of the frequency or nonlinear processing characteristic, so that the signal may not be deteriorated. In this embodiment, meanwhile, since the delay circuit 137 may be commonly replaced by the delay circuit 134a, so that the circuit scale can be reduced.

Figure 10:
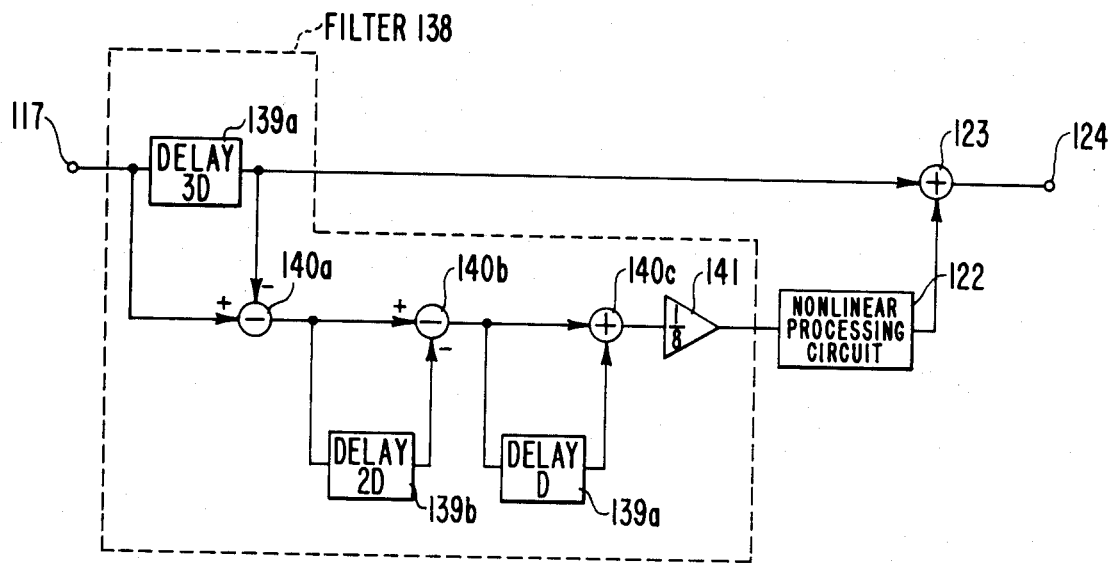
FIG. 10 is a block diagram of a video signal processing apparatus in a third embodiment of this invention.
Figure 11:
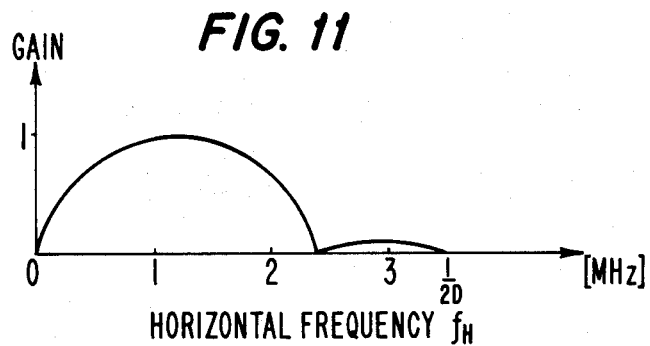
FIG. 11 and FIG. 12 are frequency characteristic diagrams showing the operation of the third embodiment of this invention.
Figure 12:
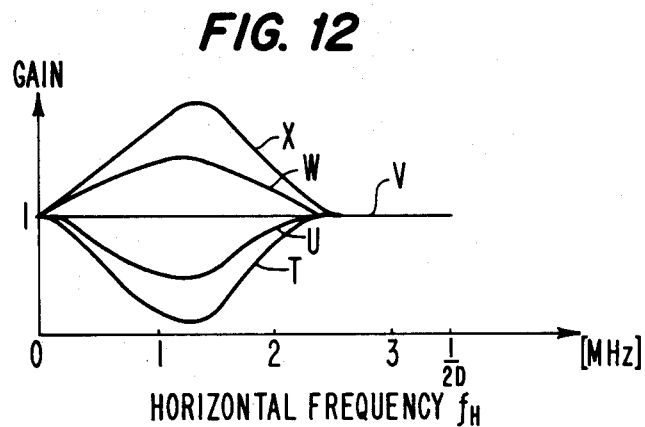

FIG. 10 is a circuit block diagram of a video signal processing apparatus in a third embodiment of this invention, which differs from the second embodiment shown in FIG. 9 only in the filter composition and its frequency characteristic. Numeral 138 is a filter, which is composed of delay circuits 139a to 139c with delay time 3D, 2D and D, respectively, operating circuits 140a to 140c, and a coefficient circuit 141 with coefficient of ½. The delay circuit 139a also functions to delay the signal being led into the adder 132, without passing through the filter 138, by delay time 3D. The frequency characteristic of this filter 139 becomes a band passing type as shown in FIG. 11 when, for example, the delay time D is about 140 nsec. When the input-output characteristic of the nonlinear processing circuit 122 is as shown by solid lines A to E in FIG. 6(a), the frequency characteristic of the circuit from the input terminal 117 to the output terminal 124 in FIG. 10 becomes as indicated by solid lines T to X in FIG. 12. At this time, the delay time of the signal from the input to output is always 3D, regardless of the frequency of input signal or input-output characteristic of the nonlinear processing circuit 122. Therefore, when the input-output characteristic of the non-linear processing circuit 122 is set as shown in FIG. 7(a) to (f), it varies as indicated by solid lines T to X in FIG. 12 depending on the amplitude of the output signal of filter 138, so that the noise region or signal in a medium band of around 1 to 2 MHz can be emphasized. In this embodiment, by using a band passing type filter, the noise in the medium band which is more impeding than the high band noise visually can be lessened.

In a fourth embodiment, a filter relating to the vertical frequency is used.

Figure 13:
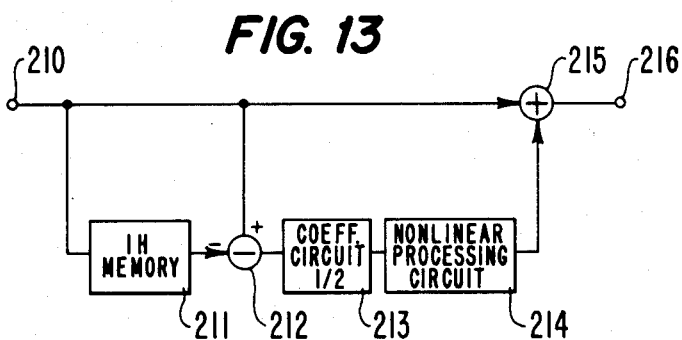
FIG. 13 is a block diagram of a video signal processing apparatus in a fourth embodiment of this invention.

FIG. 13 is a circuit block diagram of a video signal processing apparatus in the fourth embodiment of this invention, in which numeral 210 is an input terminal being fed with a luminance signal after being reproduced by the VTR, frequency-modulated, demodulated and digitized, 211 is a digital memory for delaying the input luminance signal by one horizontal scanning period (1H), 212 is a subtractor for subtracting the signal delayed by the digital memory 211 from the input luminance signal, 213 is a coefficient circuit for multiplying the output signal of the subtractor 212 by ½, 214 is a nonlinear processing circuit for delivering a specific output depending on the amplitude of the output signal of the coefficient circuit 213, 215 is a subtractor for subtracting the output of the nonlinear processing circuit 214 from the input signal, and 216 is an output terminal where a noise reduced output is obtained. The nonlinear processing circuit 214 is, similarly to the embodiment shown in FIG. 4, composed of, for example, a ROM.

The operation of the video signal processing apparatus in this embodiment thus composed is basically same as that of the prior art shown in FIG. 3, and the frequency characteristic from the input terminal 210 to the input of the nonlinear processing circuit 114 is as indicated by solid line in FIG. 3(b) in the case of NTSC system, and the frequency characteristic of the circuit from the input terminal 210 to the output terminal 216 varies with the amplitude of the input signal of the nonlinear processing circuit 214.

The input-output characteristic of the nonlinear processing circuit 214 can be freely realized as shown in FIG. 7 same as in the case of the preceding embodiment shown in FIG. 4, so that the reduction of noise and enhancement of resolution can be achieved.

Thus, in this embodiment, because of 1 H delay by using digital memory, the size can be reduced; the cost is lowered by the semiconductor composition, as compared with the conventional use of glass delay line; only one demodulator is used; and sufficient noise removing effect can be exhibited. In addition to these effects, because of nonlinear processing in the form of digital signal, any desired nonlinear input-output characteristic can be realized. As a result, it is possible to remove only noise without deteriorating the vertical resolution as compared with the prior art, and the characteristic to suppress the noise and improve the vertical resolution of the signal at the same time can be also realized.

Figure 8:
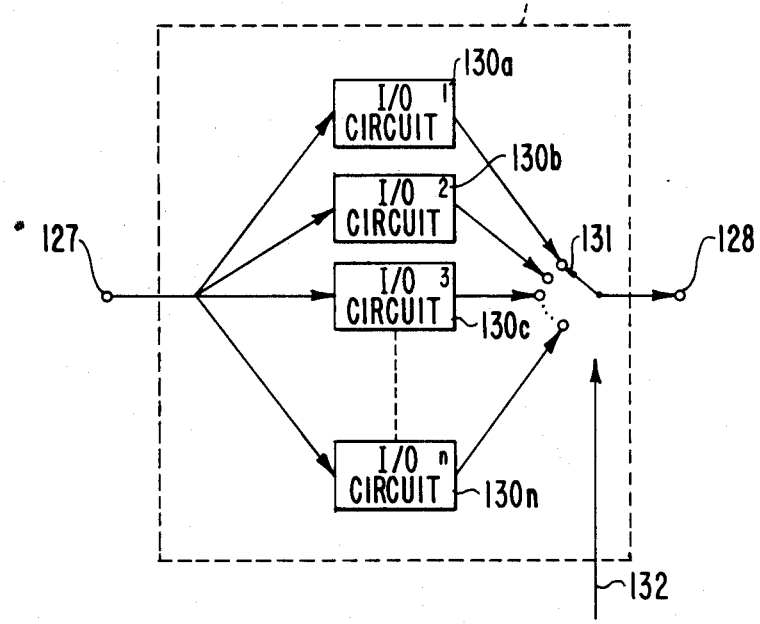
FIG. 8 is a block diagram of an embodiment of nonlinear processing circuit possessing plural nonlinear input-output characteristics in the video signal processing apparatus of this invention.

Also in this embodiment, it is possible to compose the nonlinear processing circuit 214 to possess plural input-output characteristics as shown in FIG. 8. As a result, by selecting the input-output characteristic properly depending on the type of picture or level of noise, it is possible to adjust the amount of noise reduction and the emphasis of the vertical resolution.

As the more advanced forms of this invention, below are described the embodiments comprising plural digital filter means for dividing the horizontal and vertical two-dimensional frequency region of digitized input luminance signal into plural two-dimensional frequency bands, plural nonlinear processing means for nonlinearly processing the outputs of the plural filters, and a mixing means to mix the outputs of the plural nonlinear processing means. In this composition, the signal component and noise component may be separated more clearly, and the noise can be suppressed without deteriorating the signal component, and also the noise component superposing on the signal can be reduced efficiently.

Figure 14:
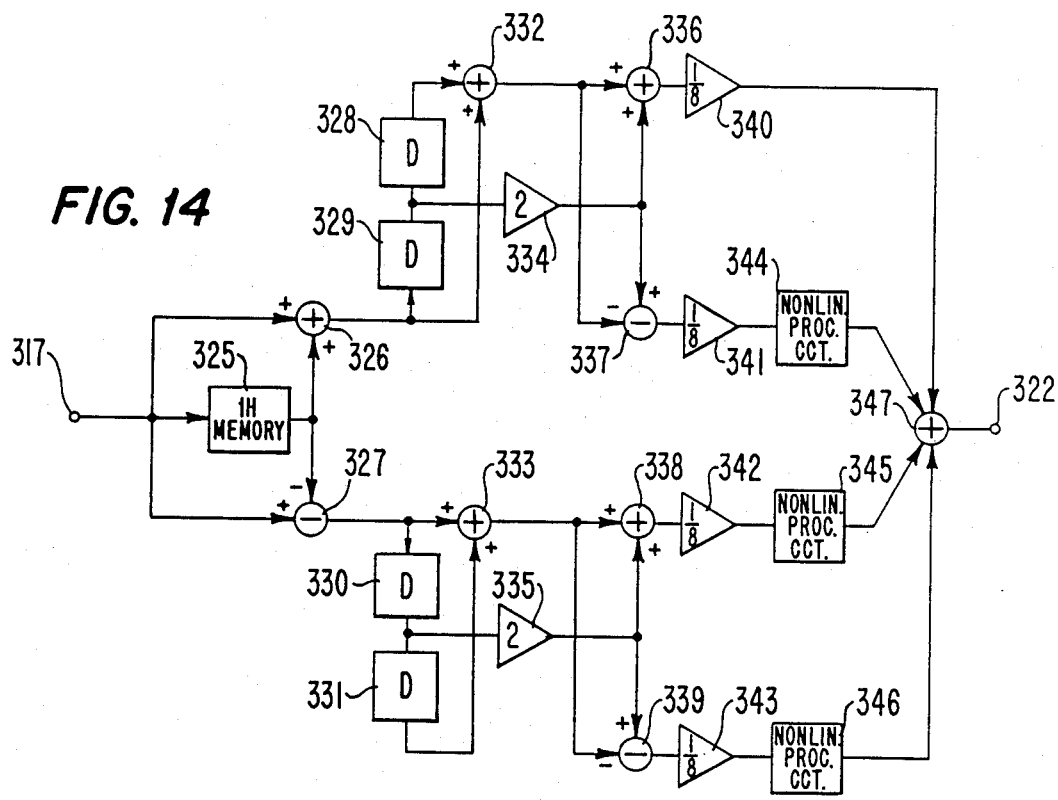
FIG. 14 is a block diagram of a video signal processing apparatus in a fifth embodiment of this invention.

FIG. 14 is a configuration of video signal processing apparatus in a fifth embodiment of this invention, in which numeral 317 is an input signal of reproduced FM luminance signal being demodulated and digitized, and 322 is an output signal of the signal lowered in the noise level. Numeral 325 is a memory for delaying the signal by 1H, 326 is an adder, 327 is a subtractor, 328, 329, 330 and 331 are delay circuits each with delay time D (where D=about 140 nsec), 332 and 333 are adders, 334 and 335 are coefficient circuits for doubling the signal, 336 and 338 are adders, 337 and 339 are subtractors, 340 and 341 are coefficient circuits for multiplying the signal by $\frac{1}{2}$, 344 to 346 are nonlinear processing circuits having nonlinear input-output characteristics, and 347 is an adder for mixing the four output signals of the nonlinear processing circuits 344 to 346 and coefficient circuit 341.

In this configuration, the transfer functions from the input terminal 317 to the coefficient circuits 340 to 343 are defined as follows, supposing the delay of delay time D to be $z^{-1}$ and the delay of H to be $w^{-1}$.

$$\tfrac{1}{4}(1+2z^{-1}+z^{-2}+w^{-1}+2w^{-1}z^{-1}+w^{-1}z^{-2}) \quad (1)$$

$$\tfrac{1}{4}(-1+2z^{-1}-z^{-2}-w^{-1}+2w^{-1}z^{-1}-w^{-1}z^{-2}) \quad (2)$$

$$\tfrac{1}{4}(1+2z^{-1}+z^{-2}-w^{-1}2w^{-1}z^{-1}-w^{-1}z^{-2}) \quad (3)$$

$$\tfrac{1}{4}(-1+2z^{-1}-z^{-2}+w^{-1}2w^{-1}z^{-1}+w^{-1}z^{-2}) \quad (4)$$

When these transfer functions are expressed by the two-dimensional frequencies of horizontal frequency $f_H$ and vertical frequency $f_V$, they may be as shown in FIGS. 15(a) to (d)-, respectively, in the case of NTSC system when D is about 140 nsec. For the sake of simplicity, these frequency characteristics are expressed as shown in FIGS. 15(e) to (h) (where, however, the signal band is limited to $f_H<3$ MHz, $f_V <525/2$ cy/ph). Here, the shaded areas refer to the frequency region with the gain of frequency characteristics in (a) to (d) of about $-3$ dB or more. As clear from this diagram, the four outputs from the input terminal 317 to the coefficient circuits 340 to 343 in the configuration of FIG. 14 are respectively filters to divide the two-dimensional frequency region into four bands. On the other hand, the characteristic of the apparatus from the input terminal 317 to the output of adder 347 is such that the outputs of four filters are synthesized in the adder 347, if the signal passes through nonlinear processing circuit 344 to 346 without undergoing change, and the transfer coefficient will be the sum of equations (1) to (4), that is, $$(1)+(2)+(3)+(4)=z^{-1}.$$

Figure 16:
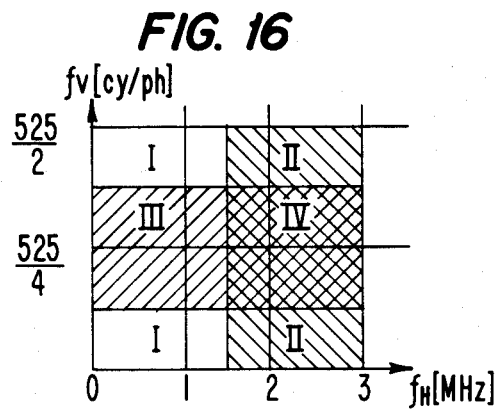
FIGS. 15(a)–15(h) and FIG. 16 are frequency characteristic diagrams showing the operation of the fifth embodiment of this invention.
Figure 17:
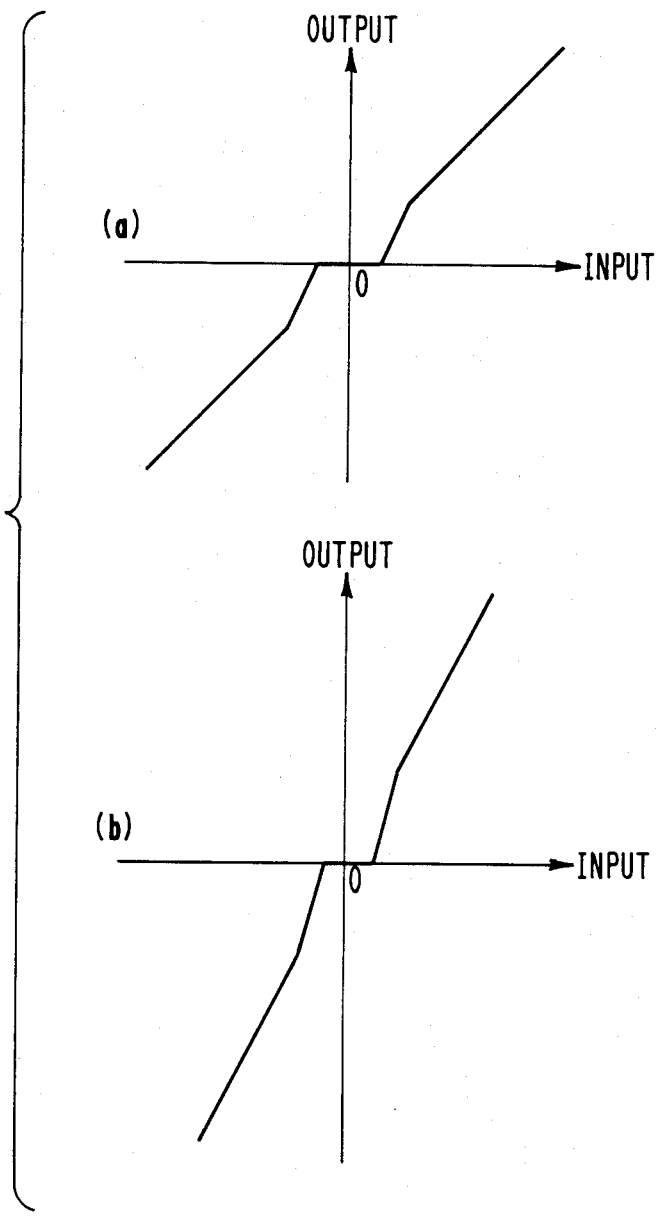
FIGS. 17(a) and (b) are input-output characteristic diagrams of nonlinear processing circuits in the fifth and sixth embodiments of the invention.

It means that the signal from the input terminal 317 is delayed by D, and it does not affect the frequency characteristic of the signal. However, supposing that the nonlinear processing circuit 346 does not permit signal to pass through, the transfer function of the apparatus from the input end of 320 to the output of adder 347 is the sum of only equations (1) to (3). The frequency characteristic at this time is, referring to FIG. 16, such that only the two-dimensional frequency band of IV is attenuated to $-3$ dB or less. Similarly, when the nonlinear processing circuits 344, 345 do not allot to pass signal, the frequency bands of II, III in FIG. 16 are attenuated, respectively. Here, when the input-output characteristics of the nonlinear processing circuits 344 to 346 are so set as not to pass the low level signals as shown in FIG. 17(a), if the amplitude of the component passing through each filter is small, such noise does not pass through the nonlinear processing circuit, and the frequency component of the noise is suppressed. However, if the filter output is a large amplitude signal, it directly passes through the nonlinear processing circuit, so that the signal is not deteriorated.

When this embodiment is compared with the noise removing apparatuses in the embodiments shown in FIG. 9 and FIG. 13, there are several advantages. In explaining these advantages, the operation of the embodiments of FIG. 9 and FIG. 13 and their cascade connection is discussed below in the two-dimensional frequency region.

In the embodiment of FIG. 9, the frequency band of the output of the filter 133, that is, the signal fed into the nonlinear processing circuit 122 corresponds, in FIG. 16, to bands II and IV. In the embodiment shown in FIG. 13, the band of the signal fed into the nonlinear processing circuit 214 corresponds to bands III and IV in FIG. 16. In both cases, the band is about $\frac{1}{2}$ of the total two-dimensional frequency region, and it must be noted that a relatively large energy is led into the nonlinear processing circuit.

The operation of cascade connection of the embodiments of FIG. 13 and FIG. 9 is as follows. The noise contained in the signal reproduced by the VTR is a white noise over an entire band, while the signal spectrum is concentrated in a narrow frequency band. Supposing the signal spectrum is present only in region I in FIG. 16, since the regions III and IV led into the nonlinear processing circuit in FIG. 13 and the regions II and IV led into the nonlinear processing circuit in FIG. 9 are both noise components of a small amplitude only, and noise existing in the frequency regions of II to IV will be suppressed. Or, if a signal spectrum with large amplitude is concentrated in the region III, the noise reducing effect by the apparatus in FIG. 13 is not present, but since the regions II and IV have only noise components of small amplitude, the noise in these regions is suppressed by the apparatus in FIG. 9. That is, the noise of the frequency components of II and IV superposed on the signal having spectrum in the region III is suppressed, and a favorable picture can be obtained. Similarly, when there are signal components only in the region II, the noise of the frequency components of III and IV superposed on the signal is suppressed by the device of FIG. 13. In this composition, however, if there is a signal component of large amplitude in the region IV which corresponds to the oblique component of picture image, the noise is not removed by the apparatuses of FIG. 13 and FIG. 9, and the noise of the frequency components II and III superposed on this signal cannot be reduced.

Figure 15A:
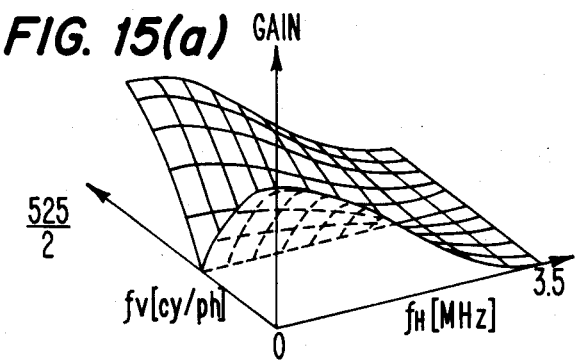
Figure 15B:
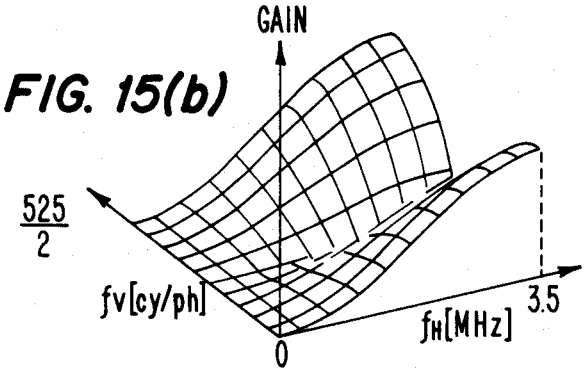
Figure 15C:
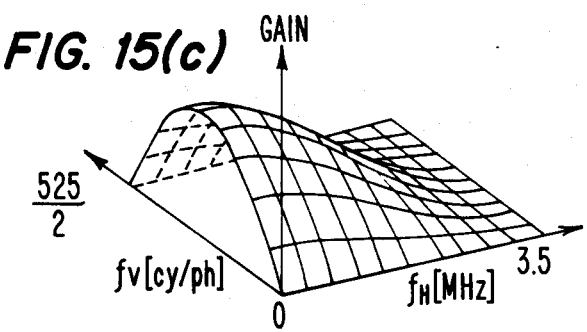
Figure 15D:
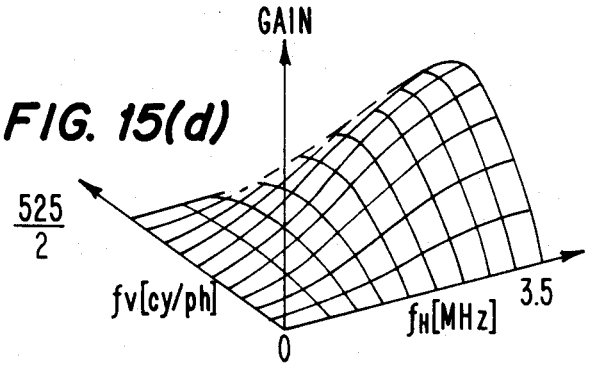
Figure 15E:
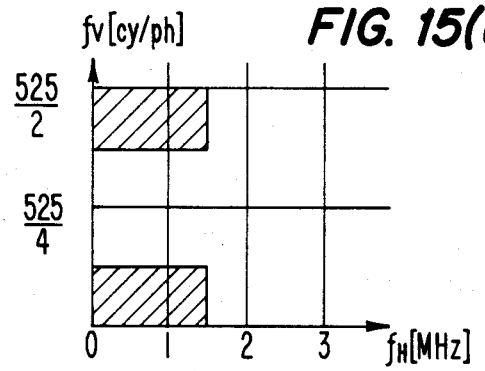
Figure 15F:
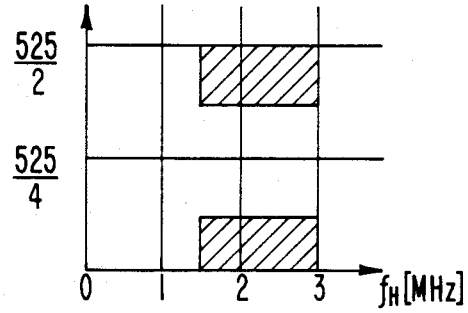
Figure 15G:
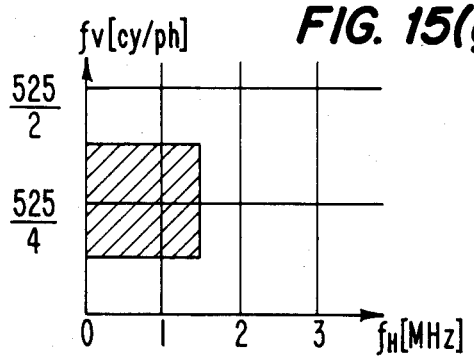
Figure 15H:
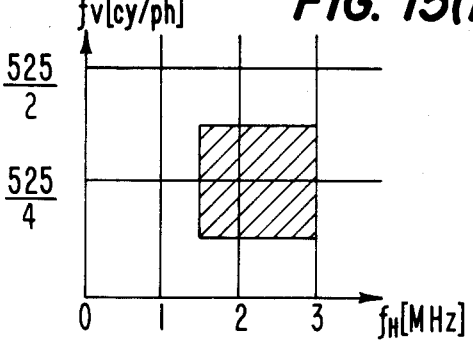

By contrast, in this embodiment, as shown in FIG. 15(e) to (f), the signals led into individual nonlinear processing circuits are about $\frac{1}{4}$ of the total two-dimensional frequency region of the signal, being narrower as compared with the frequency band led into the nonlinear processing circuit in the embodiment shown in FIG. 9 or FIG. 8. Therefore, of the noise uniformly distributing in the entire band, the amplitude of the noise led into the respective nonlinear processing circuits decreases, and the non-passing amplitude of the nonlinear input-output characteristic shown in FIG. 17(a) can be set smaller. To the contrary, since the signal components are concentrated in a narrow frequency band, one of the four filter outputs is concentrated, and the amplitude does not decrease so much. As a result, the signal and noise can be separated clearly, and only the noise can be reduced without much deteriorating delicate luminance changes. That is a first feature of this embodiment As explained previously in relation to FIG. 16, when the embodiments of FIG. 13 and FIG. 9 are connected in cascade, the noise reducing effect is not obtained at all when there is a signal with large amplitude in the region IV which corresponds to the oblique component of picture image, and the noise superposed on this signal cannot be suppressed. In this embodiment, by contrast, since nonlinear processing is effected in each one of regions II to IV, if there is a signal with large amplitude in region IV, the noise of the frequency components in the regions II and III superposed on that signal can be suppressed, so that a favorable picture can be obtained. This is a second feature of this embodiment.

A third feature is that different nonlinear processings can be given to the three frequency regions II to IV in FIG. 16. Generally, the reproduced signal of VTR is deteriorated in the high band of horizontal frequency. By contrast, the noise component in high band is hardly impeding visually, as compared with the noise in medium or low band. Accordingly, by setting the nonpassing amplitude of the nonlinear processing circuit in the regions II and IV smaller as compared with the region III containing the signal in the medium or low band of the horizontal frequency, deterioration of small signals in high band can be prevented, so that the picture can be visually improved. Concerning the frequency regions of II and IV, while the region II comprises signals of fine vertical patterns, the region IV corresponds to signals of fine oblique patterns. Generally, in the picture, the oblique pattern is not so important for small signals, as compared with the vertical pattern, with respect to the picture quality and visual effect. Accordingly, as compared with the non-passing amplitude of the nonlinear processing circuit with respect to region II, by setting that of the region IV somewhat larger, the larger noise can be suppressed while hardly deteriorating the picture quality visually. In this embodiment, thus, the optimum nonlinear characteristic can be determined separately depending on the signal of divided frequency regions and nature of noise.

As mentioned hereabove, this embodiment owns numerous excellent features. In addition to them, the entire device may be composed of semiconductors and structured as one-chip IC, so that the device can be small-sized, adjustment-free, and lowered in cost, while only one frequency demodulator is needed. These features are same as in the preceding embodiments.

Moreover, in this embodiment, by determining the input-output characteristic of the nonlinear processing circuit as shown in FIG. 17(b), the noise with small amplitude can be suppressed, while the signal with large amplitude can be emphasized, so that the resolution can be enhanced without increasing the noise. Furthermore, not to mention, the nonlinear processing circuits 344, 345 and 346 may be composed to realize plural nonlinear input-output characteristics as shown in FIG. 8.

A seventh embodiment of this invention is described below.

Figure 18:
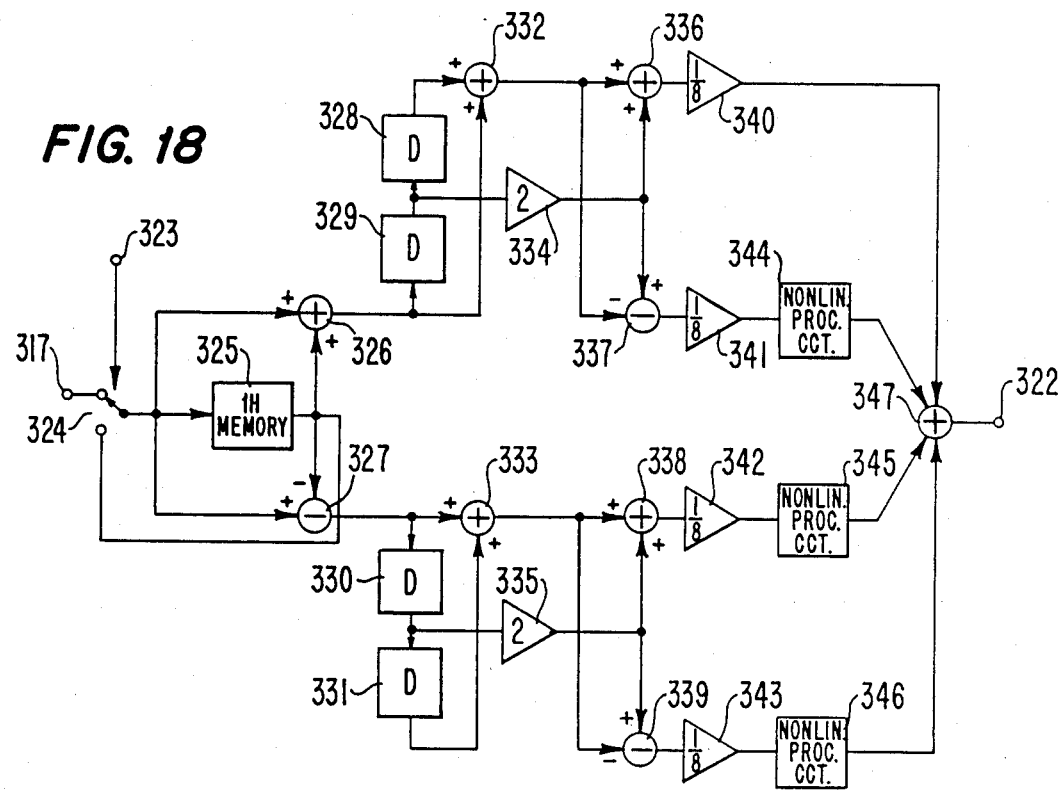
FIG. 18 is a block diagram of a video signal processing apparatus in a sixth embodiment of this invention.

FIG. 18 is a configuration of a video processing apparatus in the seventh embodiment of this invention. What differs from the sixth embodiment shown above lies in the dropout compensating function making use of the signal delayed by 1H which is obtained at the time of making up the two-dimensional filter. In FIG. 18, numeral 323 is an input terminal of dropout detection signal to tell the presence or absence of dropout, 324 is a switch to be controlled by the dropout detection signal, and other parts are same as in the embodiment shown in FIG. 14 and are given the same numerals.

The operation of thus composed embodiment is as follows. The switch 323 is usually connected to the upper side, where an excellent noise removing effect is obtained exactly the same as in the embodiment shown in FIG. 14. On the other hand, when dropout occurs in the input signal, it is controlled so that the switch 324 is connected to the lower side by the dropout detection signal fed from the switch 323. As a result, the output of the switch 324 is replaced by the 1H delayed signal, so that the dropout is compensated.

In this embodiment, besides the excellent noise removing effect as in the embodiment in FIG. 14, compensation of dropout in the form of digital signal by using 1H delayed signal is effected, and unlike the conventional case of compensating the FM signal with the signal delayed by glass delay line, the annoying noise caused by discontinuity at the phase change point of FM signal does not occur in principle. Or even against a dropout longer than 1H, the compensating signal is not deteriorated due to decrease of amplitude or band, so that an excellent compensation is achieved.

What is claimed is:

1. A video signal processing apparatus comprising:
    a digital vertical filter means for passing a signal in a specific vertical high frequency band of a digitized input luminance signal;
    a digital nonlinear processing circuit means operatively coupled to said vertical filter means for suppressing one of a luminance signal component and a noise signal component of the signal from said vertical filter means while maintaining the other signal component as is or for emphasizing said luminance signal component of the signal from said vertical filter means while maintaining as is or suppressing said noise component of the signal from said vertical filter means; and
    an arithmetic operation circuit means including means for arithmetically synthesizing said digitized input luminance signal and an output signal of said nonlinear processing circuit so as to cancel said noise signal component thereof or so as to increase said digitized input luminance signal thereof, thereby obtaining a digitized luminance output signal having an improved signal-to-noise ratio in said specific vertical high frequency band.

2. An apparatus as in claim 1, wherein said vertical filter means comprises a memory means for delaying said digitized input luminance signal by one horizontal scanning period, and an arithmetic operation circuit means for producing a difference between said digitized input luminance signal and an output signal of said memory means, thereby obtaining said signal in said specific vertical high frequency band of said digitized input luminance signal.

3. An apparatus as in claim 1, wherein said nonlinear processing circuit means suppresses, as said noise signal component of the signal from said vertical filter means, a signal component having an amplitude below a specified level of the signal from said vertical filter means.

4. An apparatus as in claim 1, wherein said nonlinear processing circuit means emphasizes, as said luminance signal component of the signal from said vertical filter means, a signal component having an amplitude above a specified level of the signal from said vertical filter means.

5. An apparatus as in claim 1, wherein said nonlinear processing circuit means suppresses, as said noise component of the signal from said vertical filter means, a signal component having an amplitude below a specified level of the signal from said vertical filter and emphasizes, as said luminance signal component of the signal from said vertical filter means, a signal component thereof having an amplitude above said specific level of the signal from said vertical filter means.

6. An apparatus as in claim 1, wherein said nonlinear processing circuit means comprises a read-only memory means for using the signal from said vertical filter means as an address and having a memory content, written in the address, used for forming the output signal of said nonlinear processing circuit means.

7. An apparatus as in claim 1, wherein said nonlinear processing circuit means includes comprises a plurality of input/output circuit means having different input-output characteristics from one another, and a selection circuit means for selecting one output signal from output signals from said plurality of input/output circuit means as the output signal of said nonlinear processing circuit means.

8. A video signal processing circuit comprising:
a plurality of digital filter means for dividing a digitized input luminance signal into a plurality of signals in a plurality of different horizontal and vertical two-dimensional frequency regions;
a plurality of digital nonlinear processing circuit means said plurality of digital filter means, respectively, each for suppressing one of a luminance signal component and a noise signal component of each of output signals of said plurality of digital filter means while maintaining the other signal component as is or for emphasizing said luminance signal component of each of the output signals of said plurality of digital filter means while maintaining as is or suppressing said noise signal component of each of the output signals of said plurality of digital filter means; and
an arithmetic operation circuit means for arithmetically synthesizing output signals of said plurality of nonlinear processing circuit so as to cancel said noise signal component thereof or so as to increase said luminance signal component thereof, thereby obtaining a digitized luminance output signal having an improved signal-to-noise ratio.

9. An apparatus as in claim 8, wherein each of said plurality of nonlinear processing circuit means suppresses, as said noise signal component of an output signal from its respective digital filter means, a signal component thereof having an amplitude below a specified level of one output signal from said plurality of digital filter means.

10. An apparatus as in claim 8, wherein each of said plurality of nonlinear processing circuit means emphasizes, as said luminance signal component of an output signal from its respective digital filter means, a signal component thereof having an amplitude above a specified level of one output signal from said plurality of digital filter means.

11. An apparatus as in claim 8, wherein each of said plurality of nonlinear processing circuit means suppresses, as said noise signal component of an output signal from its respective digital filter means, a signal component thereof having an amplitude below a specified level of one output signal from said plurality of digital filter means and emphasizes, as said luminance signal component thereof, a signal component thereof having an amplitude above said specified level of said one output signal from said plurality of digital filter means.

12. An apparatus as in claim 8, wherein each of said plurality of nonlinear processing circuit means comprises a read-only memory means for using one of the output signals from said plurality of digital filter means as an address and having a memory content, written in the address, used for forming the output signal of said each of said plurality of nonlinear processing circuit means.

13. An apparatus as in claim 8, wherein each of said plurality of nonlinear processing circuit means comprises a plurality of input/output circuit means having different input-output characteristics from one another, and a selection circuit means for selecting one output signal from output signals from said plurality of input/output circuit means as an output signal of each of said plurality of nonlinear processing circuit means.

14. A video signal processing apparatus comprising:
first through fourth digital filter means for dividing a digitized input luminance signal into four signals in first through fourth horizontal and vertical two-dimensional frequency regions, said first through fourth digital filter means having respectively the following transfer functions:

(1) $\frac{1}{8}(1+2z^{-1}+z^{-2}+w^{-1}+2w^{-1}z^{-1}+w^{-1}z^{-2})$ (2) $\frac{1}{8}(-1+2z^{-1}-z^{-2}-w^{-1}+2w^{-1}z^{-1}-w^{-1}z^{-2})$ (3) $\frac{1}{8}(1+2z^{-1}+z^{-2}w^{-1}-2w^{-1}z^{-1}-w^{-1}z^{-2})$ (4) $\frac{1}{8}(-1+2z^{-1}-z^{-2}+w^{-1}-2w^{-1}z^{-1}-w^{-1}z^{-2})$ where $w^{-1}$ is a delay of one horizontal scanning period, $z^{-1}$ is a delay of a specified period D, and $z^{-2}$ is a delay of a specified period 2D;
three digital nonlinear processing circuit means operatively coupled to said second through fourth digital filter means, respectively, each for suppressing one of a luminance signal component and a noise signal component of each of output signals of said second through fourth digital filter means while maintaining the other component as is or for emphasizing said luminance signal component of each of the output signals of said second through fourth digital filter means while maintaining as is or suppressing said noise signal component of each of the output signals of said second through fourth digital filter means; and
an arithmetic operation circuit means for arithmetically synthesizing an output signal of said first digital filter means and output signals of said three nonlinear processing circuit means so as to cancel said noise signal component thereof or so as to increase said luminance signal component thereof, thereby obtaining a digitized luminance output signal having an improved signal-to-noise ratio.

15. An apparatus as in claim 14, wherein each of said three nonlinear processing circuit means suppresses, as said noise signal component, a signal component having an amplitude below a specified level of one output signal from said second through fourth digital filter means.

16. An apparatus as in claim 14, wherein each of said three nonlinear processing circuit means emphasizes, as said luminance signal component, a signal component having an amplitude above a specified level of one output signal from said second through fourth digital filter means.

17. An apparatus as in claim 14, wherein each of said three nonlinear processing circuit means suppresses, as said noise signal component, a signal component having an amplitude below a specified level of one output signal from said second through fourth digital filters and emphasizes, as said luminance signal component, a signal component having an amplitude above said specified level of said one output signal from said second through fourth digital filter means.

18. An apparatus as in claim 14, wherein each of said three nonlinear processing circuits comprises a read-only memory means for using one of the output signals from said second through fourth digital filter means as an address and having a memory content, written in the address, used for forming the output signal of each of said three nonlinear processing circuits.

19. An apparatus as in claim 14, wherein each of said three nonlinear processing circuit means comprises a plurality of input/output circuit means having different input/output characteristics from one another, and a selection circuit means for selecting one output signal from output signals from said plurality of input/output circuit means as the output signal of each of said three nonlinear processing circuit means.

* * * * *